ically, use a redox system. In the inverse free radical polymerization of acrylate comonomers, followed later by the redox chain-transfer reaction catalyst in the latex of the invention. In particular, the method of preparing this solid, inert polymerization catalyst usable in the process of the present invention is utilized by the preparation of the acrylate comonomers with a polymerization catalyst. Generally, the catalyst of the present invention is from about 0.01 to about 5.0 percent by weight based on the total weight of the monomers being copolymerized. In a preferred embodiment, the catalyst is used in an amount ranging from about 0.1 to about 2.0 percent by weight.

United States Patent [19]
Neuschwanter et al.

[11] 4,151,147

[45] Apr. 24, 1979

[54] PROCESS FOR PREPARING ALL-ACRYLIC COPOLYMER LATEX

[75] Inventors: Chris F. Neuschwanter, Hudson; Eli Levine, Union, both of N.J.

[73] Assignee: Celanese Corporation, New York, N.Y.

[21] Appl. No.: 874,677

[22] Filed: Feb. 2, 1978

[51] Int. Cl.² ............................................. C08L 33/08
[52] U.S. Cl. ................................................. 260/29.6 T
[58] Field of Search ................................... 260/29.6 T

[56] References Cited
U.S. PATENT DOCUMENTS

| | | |
|---|---|---|
| 3,423,352 | 1/1969 | Levine et al. ............... 260/29.6 ME |
| 3,423,353 | 1/1969 | Levine et al. ............... 260/29.6 ME |
| 3,637,563 | 1/1972 | Christena ........................ 260/23.5 R |
| 3,790,520 | 2/1974 | Ludwig ............................ 260/29.6 T |
| 3,804,925 | 8/1974 | Kato et al. ....................... 260/29.6 T |
| 3,832,317 | 8/1974 | Mikofalvy et al. ............. 260/29.6 T |
| 4,056,503 | 11/1977 | Powanda et al. .............. 260/29.6 T |

*Primary Examiner*—M. J. Welsh
*Attorney, Agent, or Firm*—Linn I. Grim

[57] ABSTRACT

A process for preparing an all-acrylic copolymer latex is disclosed which comprises polymerizing two or more acrylate comonomers if the presence of an acrylate polymerization catalyst and a polymerization promoting amount of a multifunctional acrylate for a period sufficient to provide said acrylic copolymer.

8 Claims, No Drawings

PROCESS FOR PREPARING ALL-ACRYLIC COPOLYMER LATEX

BACKGROUND OF THE INVENTION

1. Field of the Invention

This invention relates to the field of acrylic polymers and more particularly, to processes for preparing all-acrylic copolymer latices which are useful as coatings, finishes, adhesives, and the like.

2. Description of the Prior Art

Acrylic latices are emulsions of acrylate comonomers, often including minor amounts of other comonomers as, for example, acrylic acid or methacrylic acid. The procedures used to prepare the emulsions are well known in the art and generally involve admixing under rapid stirring the comonomer charge with water, surfactants or emulsifying agent, a polymerization catalyst or initiator, and, in most cases, a protective colloid-forming substance. The mixture is then heated to polymerization temperature for the time required to substantially complete the emulsion polymer formation. Many variations of the general preparative procedure are used to obtain, for example, lower viscosity, high solids content, improved freeze-thaw stability, etc. These variations include, for example, the use of a pre-emulsion technique (see U.S. Pat. No. 3,637,563) in which the monomer charge is first emulsified in water using a surfactant or emulsifying agent, and then the pre-emulsion is added to the reaction mixture which contains the remaining reactants; intermediate addition of surfactant to the polymerization reaction mixture during the polymerization (see U.S. Pat. No. 3,423,352); and addition of a water-soluble free radical initiator to a substantially completely polymerized emulsion and reacting further to reduce the viscosity of the emulsion (see U.S. Pat. No. 3,423,353).

The copolymerization of all-acrylic comononers employing known and conventional acrylate catalyst systems, for example, redox catalysts such as sodium metabisulfite-potassium persulfate, frequently proceeds sluggishly due to unfavorable reaction rates. While it is known that the introduction of small quantities of multifunctional acrylate monomer into vinyl-acrylic copolymers (commonly assigned copending U.S. patent application Ser. No. 856,363 filed Dec. 1, 1977) and vinyl-acrylic copolymers (commonly assigned copending U.S. Pat. No. 4,056,503, filed Oct. 18, 1976) will significantly improve the properties of these coating resins, heretofore there has been no recognition or appreciation that the use of minor amounts of multifunctional acrylates will dramatically accelerate the copolymerization of all-acrylic latices.

SUMMARY OF THE INVENTION

It has surprisingly been discovered that the process for preparing an all-acrylic latex emulsion using an acrylate catalyst can be made to proceed at a substantially greater rate when a copolymerization promoting amount of a multifunctional acrylate is added to the comonomer charge.

As used herein, the expression "all acrylic copolymer" shall mean copolymers derived from the copolymerization of esters derived from the reaction of monohydric alcohols with acrylic acid or lower alkyl-substituted acrylic acid, optionally, together with minor amounts of other comonomers. The expression "multifunctional acrylate" shall be understood herein to mean the esters derived from the reaction of a polyhydric alcohol with acrylic acid and/or lower alkyl-substituted acrylic acid, there being at least two hydroxyl groups of the alcohol esterified with the aforesaid acids.

In addition to the aforesaid acrylate and alkyl acrylate comonomers, the monomer charge may include relatively small amounts of one or more copolymerizable modifiers such as acrylic acid or lower alkyl-substituted acrylic acid, e.g., methacrylic acid (to introduce cross-linkable pendant carboxylic groups into the copolymer backbone), hydroxyalkyl esters of acrylic acid or lower alkyl-substituted acrylic acid such as 2-hydroxyethyl acrylate, 2-hydroxypropyl acrylate, 3-hydroxypropyl methacrylate, etc. (to introduce cross-linkable pendant hydroxyl groups into the copolymer backbone), and an acrylic acid amide or lower alkyl-substituted acrylic acid amide such as hydroxymethylene diacetone acrylamide (to introduce cross-linkable pendant amide groups into the copolymer backbone). Such comonomers can be included in the charge at up to about 20%, and preferably from about 1% to about 5% of the weight of said charge.

The multifunctional acrylate polymerization promotors herein are copolymerizable with the acrylate comonomers (and other comonomers, if present) and thus constitute part of the comonomer charge. The preferred promoters are esters of aliphatic and cycloaliphatic polyols and acrylic and/or methacrylic acid.

DESCRIPTION OF THE PREFERRED EMBODIMENTS

The alkyl acrylate comonomers which are copolymerized herein are preferably selected from esters derived from the reaction of a lower alkanol with acrylic acid or methacrylic acid, examples of which are: methyl acrylate, ethyl acrylate, propyl acrylate, n-butyl acrylate, isobutyl acrylate, 2-ethylhexyl acrylate, methyl methacrylate, ethyl methacrylate, propyl methacrylate, n-butyl methacrylate, isobutyl methacrylate, 2-ethylhexyl methacrylate, and the like. Mixtures of an alkyl acrylate and alkyl methacrylate are preferred, and of said mixtures, a combination of butyl acrylate and methyl methacrylate is especially preferred. The butyl acrylate is generally present at from about 55% to about 90%, and preferably from about 45% to about 70%, of the weight of the total comonomer charge. The methyl methacrylate is suitably employed at a level of from about 5% to about 50%, and preferably from about 10% to about 45%, of the weight of the total comonomer which at least two hydroxy groups are esterified. Exemplary preferred multifunctional acrylate compounds include: ethylene glycol diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetra-acrylate and methacrylate, dipentaerythritol hexacrylate, tripentaerythritol hexacrylate, tripentaerythritol octaacrylate, trimethylolpropane triacrylate, trimethylolethane triacrylate, sorbitol hexacrylate, 1,3-propanediol diacrylate, 1,3-butylene glycol diacrylate, 1,5-pentanediol dimethacrylate, 1,6-hexanediol diacrylate, the bisacrylates and methacrylates of polyethylene glycols of a molecular weight of 200-1500, and the like, including mixtures in all proportions.

The multifunctional acrylates are generally effective in promoting the rate of copolymerization herein when used at from about 0.1% to about 1.0%, preferably about 0.5%, of the weight of the total comonomer charge. Levels of multifunctional acrylate greater or lesser than this can also be used to good effect depending upon the nature of the charge and the particular reaction conditions employed.

For the present all-acrylic latex emulsion copolymers, it is preferred to add the monomer mixture, including the multifunctional acrylate polymerization promoter, to an aqueous surfactant-containing solution with adequate stirring to obtain a stable pre-emulsion which is then added to the polymerization reaction medium containing the acrylate polymerization catalyst and preheated to reaction temperature. The addition of the pre-emulsion of comonomers is regulated to allow control over the polymerization. In general, the rate of addition of the pre-emulsion is usually such that at least one hour and usually two hours and more are required for the total addition. In all cases, the rates of addition of reactants are controlled to permit regulation of the reaction temperature to below 100° C. and preferably not higher than about 75° C. After the addition of monomer charge, it is usually preferred to add a minor amount of catalyst and continue heating the mixture to assure complete reaction of all monomers. This latter step is to avoid detectable monomer odor in the product when intended for coating uses.

The surfactants, or emulsifying agents, employed can be any of the anionic, cationic or non-ionic materials, commonly employed, as well as mixtures thereof, provided that preferably, a predominant amount of surfactant, i.e., at least 50% based on total weight of surfactant used, and usually all of the surfactant, contains at least four ether linkages. The surfactants are normally employed at levels of from about 1% to about 10% of the weight of total monomers present.

A particularly preferred class of polyether surfactants or emulsifying agents encompasses ethylene oxide and propylene oxide condensates in general, e.g., straight and branched-chain alkyl and alkylaryl polyethylene glycol and polypropylene glycol ethers and thioethers, and more particularly substances such as the "Igepals," which are members of a homologous series of alklphenoxypoly (ethyleneoxy) ethanols, which series can be represented by the general formula

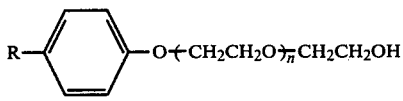

wherein

R represents an alkyl radical and n represents the number of mols of ethylene oxide employed, included among which are alkylphenoxypoly (ethyleneoxy) ethanols having alkyl groups containing from about 7 to about 18 carbon atoms, inclusive, and having from about 4 to about 100 ethyleneoxy units, such as the heptylphenoxypoly (ethyleneoxy) ethanols, nonylphenoxypoly (ethyleneoxy) ethanols and dodecylphenoxypoly (ethyleneoxy) ethanols; the sodium, potassium or ammonium salts of the sulfate esters of these alkylphenoxypoly (ethyleneoxy) ethanols; alkylpoly (ethyleneoxy) ethanols; alkylpoly (propyleneoxy) ethanols; octylphenoxyethoxy ethyldimethylbenzylammonium chloride; polyethylene glycol t-dodecylthioether; the "Tweens," which are polyoxyalkylene derivatives of hexitol (including sorbitans, sorbides, mannitans and mannides) anhydride partial long-chain fatty acid esters, such as the polyoxyalkylene derivatives of sorbitan monolaurate, sorbitan monopalmitate, sorbitan monostearate, sorbitan tristearate, sorbitan monooleate and sorbitan trioleate, the "Pluronics," which are condensates of ethylene oxide with a hydrophobic base, formed by condensing propylene oxide with propylene glycol, and the like.

As previously indicated, a protective colloid-forming substance is generally employed, and will usually contain at least one ether linkage, and preferably a plurality thereof. Included among such ether linkage-containing materials are hydroxymethyl cellulose, hydroxyethyl cellulose, ethyl hydroxyethyl cellulose, ethoxylated starch derivatives, and the like. However, other protective colloid-forming substances, i.e., ones containing no ether linkages, can also be used either alone or together with said ether linkage-containing materials, and included among these are partially and fully hydrolyzed polyvinyl alcohols, natural and synthetic gums, such as gum tragacanth and gum arabic, polyacrylic acid, poly (methyl vinyl ether/maleic anhydride), and the like. All of these materials will be used in the amounts found in conventional emulsion polymerization procedures (generally from about 0.1% to about 2% by weight, based on the total weight of the emulsion).

The emulsified monomer mixture is polymerized in the usual manner, i.e., by means of a catalytic amount of a conventional free radical polymerization catalyst or catalyst system (which can also be referred to as an addition polymerization catalyst, an acrylate polymerization catalyst or a polymerization initiator), with the proviso that the catalyst or catalyst system be substantially water soluble.

In a preferred embodiment, the acrylate polymerization reaction is carried out using a redox type catalytic system. In such a method, either avoiding presence of oxygen or removal of oxygen by some means is preferred in order to permit the catalyst to form free radicals. In a redox system, the catalyst is activitated by means of a reducing agent, which in the absence of oxygen, immediately produces free radicals without the use of heat, or with very mild heating. One of the reducing agents most commonly used is sodium metabisulite alone or together with potassium persulfates. Other suitable agents include water-soluble thiosulfates, bisulfates, hydrosulfates, and reducing salts, such as the sulfates of metal which are capable of existing in more than one valence state. This metal may include cobalt, iron, nickel, copper, etc.

The particular catalyst or catalyst system employed initially can generally be used in amounts ranging from about 0.01% to about 3% by weight based on the total weight of comonomers present.

The following examples are illustrative of the polymerization process herein and demonstrate by side-by-side comparisons, the advantage of employing a multifunctional acrylate as a polymerization promotor.

The symbols used in the examples have the following meanings:

BA—butyl acrylate
EA—ethyl ethacrylate
MMA—methyl methacrylate
MAA—methyl acrylic acid
HMDAA—hydroxymethylene diacetone acrylamide
TMPTA—trimethylolpropane triacrylate In Examples 1–5, water and surfactant were charged to the reaction vessel provided with an oil bath heater, and the contents brought to reaction temperature; catalyst and activator (redox) and preblended monomers were gradually added over 150 minutes, whereupon the reaction contents were held for one hour, followed by addition of Acrysol (Rohm and Haas), a polyacrylate thickener; the pH was adjusted to 8.5 to 9.0 with concentrated ammonia, the reaction terminated, and the reactor contents cooled.

The reactions showed an initial exotherm following initial feed of monomer, catalyst and activator.

EXAMPLE 1

| Formulation | Total Charge Emulsion A | Emulsion B |
|---|---|---|
| EA | 293.6 | 295.0 |
| MMA | 144.6 | 145.3 |
| MAA | 6.7 | 6.8 |
| TMPTA (0.5%) | 2.2 | — |
| Igepal CA-897 | 40.3 | 40.3 |
| $Na_2S_2O_7$ | 1.0 | 1.0 |
| $Na_2S_2O_5$ | 1.0 | 1.0 |
| Acrysol ASE-60 (28%) | 2.8 | 2.8 |
| Water | 507.8 | 507.8 |
| Temperature of Reactor at Feed Commencement | 44.0° C. | 46.0° C. |
| Temperature of Reactor at Initial Exotherm | 45.0° C. | 46.2° C. |
| Temperature of Initial Exotherm | 1.0° C. | 0.2° C. |
| Time for Initial Exotherm | 10 minutes | 20 minutes |

This example demonstrates that the reaction may be initiated more quickly in accordance with the invention, i.e., the time to initial exotherm may be significantly reduced when employing the multifunctional acrylate promoter.

EXAMPLE 2

| Formulation | Total Charge Emulsion A | Emulsion B |
|---|---|---|
| EA | 293.6 | 295.0 |
| MMA | 144.6 | 145.3 |
| MAA | 6.7 | 6.8 |
| TMPTA (0.5%) | 2.2 | — |
| Igepal CA 897 | 40.3 | 40.3 |
| $Na_2S_2O_7$ | 1.0 | 1.0 |
| $Na_2S_2O_5$ | 1.0 | 1.0 |
| Acrysol ASE-60 (28%) | 2.8 | 2.8 |
| Water | 507.8 | 507.8 |
| Temperature of Reactor at Feed Commencement[1] | 42.5° C. | 43.0° C. |
| Temperature of Reactor at Initial Exotherm | 43.0° C. | 43.0° C. |
| Temperature of Initial Exotherm | 0.5° C.[1] | No reaction |
| Time for Initial Exotherm | 10 minutes | 120 minutes |

[1]Note: Bath temperature increased 1.0° C. during feed-exotherm measured from point of increased temperature.

In this example, the temperature of reaction was reduced to evidence the promotion effect of the multifunctional acrylate. Under these conditions, the formulation (B) without promotor showed no reaction over 120 minutes, whereas an initial exotherm was evidenced with the formulation promoted in accordance with the invention in 10 minutes.

EXAMPLE 3

| Formulation | Total Charge Emulsion A | Emulsion B |
|---|---|---|
| EA | 293.6 | 295.0 |
| MMA | 144.6 | 145.3 |
| MAA | 6.7 | 6.8 |
| TMPTA (0.5%) | 2.2 | — |
| Igepal CA-897 | 40.3 | 40.3 |
| $Na_2S_2O_7$ | 1.0 | 1.0 |
| $Na_2S_2O_5$ | 1.0 | 1.0 |
| Acrysol ASE-60 (28%) | 2.8 | 2.8 |
| Water | 507.8 | 507.8 |
| Temperature of Reactor at Feed Commencement[1] | 43.5° C. | 43.5° C. |
| Temperature of Reactor at Initial Exotherm | 51.2° C. | 49.5° C. |
| Temperature of Initial Exotherm | 7.7° C.[1] | 6.0° C.[1] |
| Time for Initial Exotherm | 5 minutes | 5 minutes |

[1]Note: Bath temperature increased 3° C. during feed-exotherm measured from point of increased temperature.

This and other Examples show that higher initial exotherms may be achieved when utilizing the multifunctional acrylate promoter.

EXAMPLE 4

| Formulation | Total Charge Emulsion A | Emulsion B |
|---|---|---|
| EA | 293.6 | 295.0 |
| MMA | 144.6 | 145.3 |
| MAA | 6.7 | 6.8 |
| TMPTA (0.5%) | 2.2 | — |
| Triton X-405 (70%) | 40.3 | 40.3 |
| $Na_2S_2O_7$ | 1.0 | 1.0 |
| $Na_2S_2O_5$ | 1.0 | 1.0 |
| Acrysol ASE-60 (28%) | 2.8 | 2.8 |
| Water | 507.8 | 507.8 |
| Temperature of Reactor at Feed Commencement | 58.9° C. | 59.0° C. |
| Temperature of Reactor at Initial Exotherm | 62.0° C. | 61.2° C. |
| Temperature of Initial Exotherm | 3.1° C. | 2.2° C. |
| Time for Initial Exotherm | 10 minutes | 10 minutes |

EXAMPLE 5

| Formulation | Total Charge Emulsion A | Emulsion B |
|---|---|---|
| EA | 293.6 | 295.0 |
| MMA | 144.6 | 145.3 |
| MAA | 6.7 | 6.8 |
| TMPTA (0.5%) | 2.2 | — |
| Triton X-405 (70%) | 40.3 | 40.3 |
| $Na_2S_2O_7$ | 1.0 | 1.0 |
| $Na_2S_2O_5$ | 1.0 | 1.0 |
| Acrysol ASE-60 (28) | 2.8 | 2.8 |
| Water | 507.8 | 507.8 |
| Temperature of Reactor at Feed Commencement | 59.7° C. | 60.2° C. |
| Temperature of Reactor at Initial Exotherm | 64.0° C. | 63.0° C. |
| Temperature of | | |

-continued

| Formulation | Total Charge | |
|---|---|---|
| | Emulsion A | Emulsion B |
| Initial Exotherm | 4.3° C. | 2.8° C. |
| Time for | | |
| Initial Exotherm | 10 minutes | 10 minutes |

EXAMPLE 6

| Formulation | Total Charge | | | | | |
|---|---|---|---|---|---|---|
| | Emulsion A | | | Emulsion B | | |
| BA | 228.0 | | | 228.0 | | |
| MMA | 228.0 | | | 228.0 | | |
| MAA | 4.8 | | | 4.8 | | |
| TMPTA (0.5%) | 2.4 | | | — | | |
| 4-vinyl pyridine | 15.0 | | | 15.0 | | |
| Igepal CA-897 | 27.0 | | | 27.0 | | |
| Igepal CO-430 | 10.0 | | | 10.0 | | |
| $Na_2S_2O_7$ | 2.7 | | | 2.7 | | |
| $Na_2S_2O_5$ | 1.8 | | | 1.8 | | |
| Water | 468.3 | | | 480.3 | | |
| Temperature of Reactor at | I | II | III | I | II | III |
| Feed Commencement (° C.) | 49. | 49.8 | 49.8 | 50. | 50.5 | 50. |
| Temperature of Reactor at Initial | I | II | III | I | II | III |
| Exotherm (° C.) | 53.0 | 52.5 | 53.5 | 53.5 | 53.5 | 56.0 |
| Temperature of | I | II | III | I | II | III |
| Initial Exotherm (° C.) | 4.0 | 2.7 | 3.2 | 3.5 | 3.0 | 6.0 |
| Time for | I | II | III | I | II | III |
| Initial Exotherm (minutes) | 4 | 8 | 10 | 5 | 5 | 12 |

In the above Example, a three stage addition of approximately equal parts of catalyst, monomers, and surfactant was employed producing three distinct exotherms in the system, reported at I-II-III in the table above.

EXAMPLE 7

A. 228 pts. of BA, 228 parts of MMA, 4.8 pts. of MAA and 27 pts. of hydroxymethylene diacetone acrylamide (55%) were polymerized (utilizing 27 pts. of Igepal CA-897, 10 pts. of Igepal CO-430, 2.7 pts. of $Na_2S_2O_7$ and 1.8 pts. of $Na_2S_2O_5$) in 470.7 pts. of water, employing a three stage addition technique in accordance with Example 6. A first peak occurred in 4 minutes, a second appeared in 33 minutes only with reflux, and a third developed in 11 minutes, each as measured from completion of addition.

B. Utilizing the same proportions of materials but including 2.4 pts. TMPTA (0.5%) and polymerizing in 468.3 pts. of water provided a first reaction peak in 4.0 minutes, a second in 18 minutes without reflux and a third in 6 minutes. Conversion was 97.0% complete, and a clear film could be formed with a hardness of 5B-4B.

What is claimed is:

1. In a process for preparing a copolymer latex in which two or more comonomers of alkyl acrylates or alkyl methacrylates wherein the alkyl group contains from 1 to 8 carbon atoms, are polymerized in the presence of a catalytic amount of a substantially water soluble free radical polymerization catalyst for a period sufficient to provide a copolymer, the improvement which comprises polymerizing said alkyl acrylates or alkyl methacrylates in the presence of a polymerization promoting amount of a multifunctional acrylate which is an acrylic or methacrylic acid ester of a polyol in which at least two hydroxyl groups are esterified.

2. The process of claim 1 wherein the multifunctional acrylate is selected from the group consisting of ethylene glycol diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetra-acrylate and methacrylate, dipentaerythritol hexacrylate, tripentaerythritol hexacrylate, tripentaerythritol octaacrylate, trimethylolpropane triacrylate, trimethylolethane triacrylate, sorbitol hexacrylate, 1,3-propanediol diacrylate, 1,3-butylene glycol diacrylate, 1,5-pentanediol dimethacrylate, 1,6-hexanediol diacrylate and the bisacrylates and methacrylates of polyethylene glycols of a molecular weight of 200-1500.

3. The process of claim 2 wherein the multifunctional acrylate is present at from about 0.1% to about 1.0% of the weight of the total comonomer charge.

4. The process of claim 2 wherein the multifunctional acrylate is present at about 0.5% of the weight of the total comonomer charge.

5. The process of claim 2 wherein the alkyl acrylates and/or alkyl methacrylates comonomers are butyl acrylate and methyl methacrylate.

6. The process of claim 5 wherein acrylic acid or methacrylic acid is combined with the alkyl acrylates and/or alkyl methacrylates comonomers.

7. The process of claim 1 wherein the polymerization is a redox catalyst.

8. In a process for preparing a copolymer latex in which from about 55% to about 95% of butyl acrylate and from about 45% to about 70% of methyl methacrylate based on the weight of the total comonomer charge is polymerized in the presence of an acrylate polymerization catalyst of the redox type for a period sufficient to provide said acrylic copolymer, the improvement which comprises polymerizing the butyl acrylate and methyl methacrylate in the presence of from about 0.1% to about 1.0% based on the weight of the total comonomer charge, of a multifunctional acrylate selected from the group consisting of ethylene glycol diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetraacrylate and methacrylate, dipentaerythritol hexacrylate, tripentaerythritol hexacrylate, tripentaerythritol octaacrylate, trimethylolpropane triacrylate, trimethylolethane triacrylate, sorbitol hexacrylate, 1,3-propanediol diacrylate, 1,3-butylene glycol diacrylate, 1,5-pentanediol dimethacrylate, 1,6-hexanediol diacrylate and the bisacrylates and methacrylates of polyethylene glycols of a molecular weight of 200-1500.

* * * * *